(No Model.)
R. D. APPERSON.
CAR WHEEL.
No. 428,998. Patented May 27, 1890.
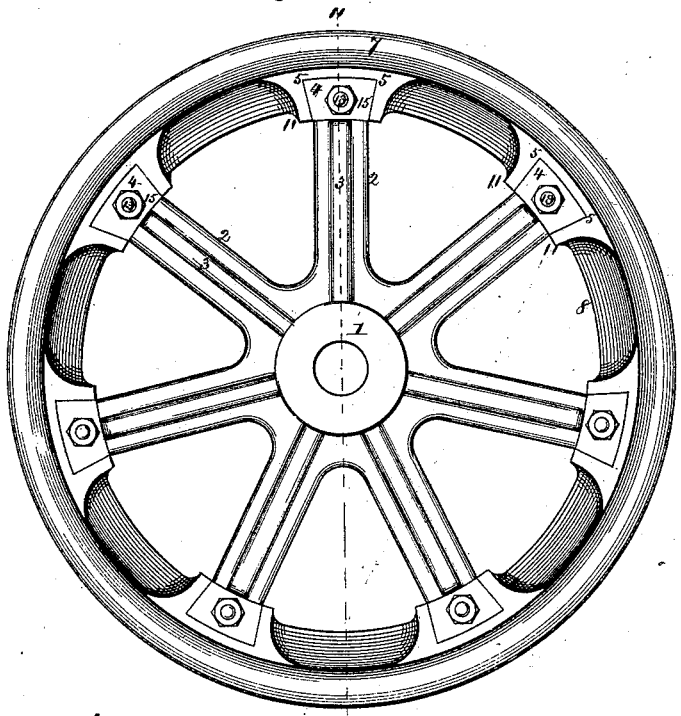
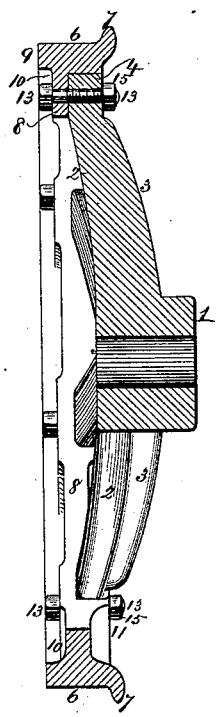
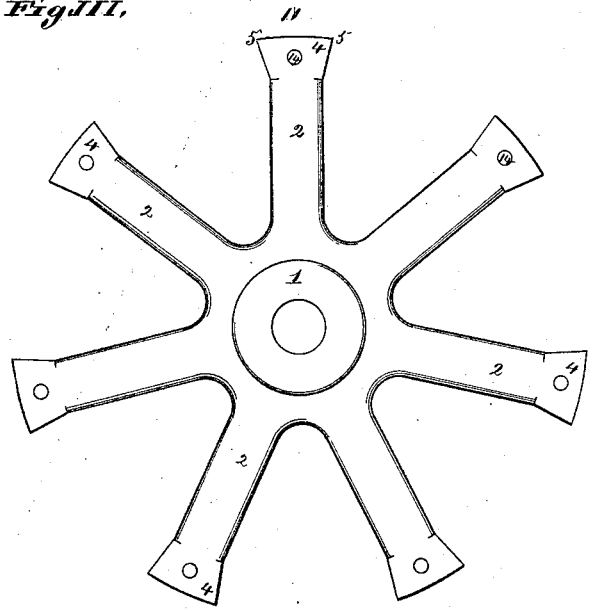
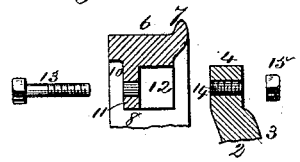
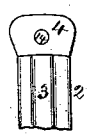
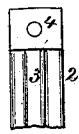
Attest:
E. Arthur
G. E. Cruse
Inventor:
Richard Duncan Apperson.
By Knight Bro.
Attys.

UNITED STATES PATENT OFFICE.

RICHARD DUNCAN APPERSON, OF LITTLE ROCK, ARKANSAS.

CAR-WHEEL.

SPECIFICATION forming part of Letters Patent No. 428,998, dated May 27, 1890.

Application filed March 6, 1890. Serial No. 342,830. (No model.)

*To all whom it may concern:*

Be it known that I, RICHARD DUNCAN APPERSON, of the city of Little Rock, in the county of Pulaski, in the State of Arkansas, have invented a certain new and useful Improvement in Car-Wheels, of which the following is a full, clear, and exact description, reference being had to the accompanying drawings, forming part of this specification.

This wheel is more especially intended for street-cars. It is composed of two main parts, one part being the hub and spokes and the other the rim. Each spoke terminates with a tenon which fits in a recess of the rim. The construction is such that the rim may be easily removed when worn out and another substituted.

Figure I is an inside elevation of the wheel. Fig. II is an axial section at II II, Fig. I. Fig. III is an outside view of the hub and spokes. Fig. IV is a detail section showing part of the rim and spoke detached. Figs. V and VI are detail views showing the spoke-tenons of different forms.

1 is the hub.

2 are spokes extending radially, and preferably cast integral with the hub. The spokes are curved, so as to give a dish to the wheel, as seen in Fig. II, and upon the inner or convex side of the spokes is a stiffening-rib 3. The spokes terminate in a tenon 4, which in Figs. I and III is shown of dovetail form with angular corners 5. In Fig. V the tenon has a general dovetail form with rounded corners, while in Fig. VI the tenon is rectangular.

The rim has the ordinary tread 6 and flange 7, and has an interior web or flange 8, that is set inward from the outer edge 9 of the rim, so as to leave an annular recess 10.

11 are mortise-blocks that are cast upon the inner side of the rim and formed with recesses 12, in which the tenon fits tightly. The tenon is held in the mortise by a bolt 13, which passes through the web or flange 8, and which is tapped into the tenon 4. The screw-threaded bolt-hole of the tenon is seen at 14, Fig. IV. The bolt 13 extends through the tenon and is fitted with a nut 15, which acts as a jam-nut, preventing the loosening of the bolt.

I claim as new and of my invention—

1. A car-wheel having hub and spokes cast in one piece, the spokes terminating in tenons, the rim cast with recesses in which the said tenons fit tightly, and bolts 13, securing the tenons in the recesses, substantially as set forth.

2. A car-wheel having spokes terminating in tenons, with screw-threaded holes 14, a rim with recesses adapted to receive the tenons, and screw-bolts 13, passing through the web 8 and engaging in the screw-holes 14, substantially as set forth.

3. A car-wheel having spokes terminating in tenons 4, with screw-threaded bolt-holes 14, a rim with recesses 12, adapted to receive the tenons 4, a screw-bolt 13, passing through the web 8 and tapped in the screw-hole 14 of the tenon, and a jam-nut 15, all constructed and adapted together substantially as set forth.

4. A car-wheel having spokes terminating in tenons 4, with screw-holes 14, a rim having an interior web 8 set inward from the outer side 9 of the rim, forming a recess 10, and bolts passing through the web 8 and tapped in the tenons, and having heads within the annular recess 10, substantially as set forth.

RICHARD DUNCAN APPERSON.

In presence of—
P. C. SAVAGE,
E. B. PEAVES.